United States Patent
Federline

[15] 3,670,443
[45] June 20, 1972

[54] ALARM HOLDER FOR FISHING RODS

[72] Inventor: Richard G. Federline, Thurmont, Md.
[73] Assignee: Don Eugene Webb, Thurmont, Md. ; a part interest
[22] Filed: Nov. 2, 1970
[21] Appl. No.: 86,157

[52] U.S. Cl. ................................................................43/17
[51] Int. Cl. .........................................................A01k 97/12
[58] Field of Search ................................................43/17, 16

[56] References Cited

UNITED STATES PATENTS

| | | | |
|---|---|---|---|
| 2,554,197 | 5/1951 | Kronquest | 43/17 |
| 2,567,777 | 9/1951 | Massino | 43/17 |
| 2,816,388 | 12/1957 | Hartley | 43/17 |
| 3,389,489 | 6/1968 | Burns | 43/17 |

*Primary Examiner*—Samuel Koren
*Assistant Examiner*—Daniel J. Leach
*Attorney*—Jennings Bailey, Jr.

[57] ABSTRACT

An arm extending upwardly at an acute angle from the end wall of a tackle box has pivoted on it, with slight frictional engagement, a bar which extends on both sides of the pivot. The hinged top of the box carries at its end remote from the arm a clamp for holding the butt of the rod. The bar normally occupies a position at a slight angle to the angle of the support, and at its upper end has a fork which is adapted to engage the stem of a fishing rod. Opposite the lower end of the bar, and carried by the support, is a microswitch or the like which when pressed closes an electrical circuit. Closing of the electrical circuit, which occurs when a fish has hooked onto the line, rings a bell and simultaneously lights a light.

5 Claims, 5 Drawing Figures

PATENTED JUN 20 1972
3,670,443
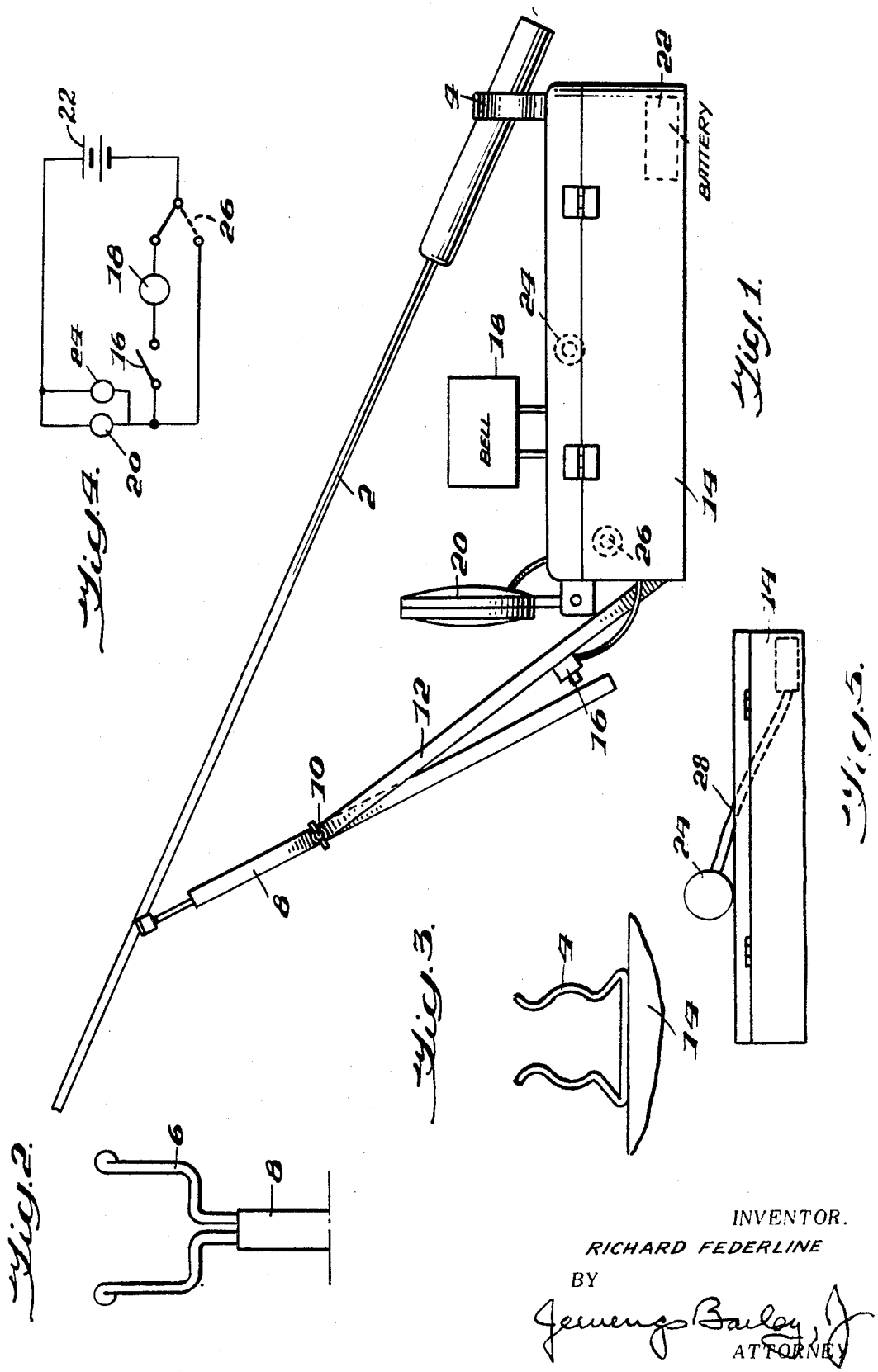
INVENTOR.
RICHARD FEDERLINE
BY
Jemengo Bailey, Jr
ATTORNEY

ALARM HOLDER FOR FISHING RODS

BACKGROUND OF THE INVENTION

1. Field of the Invention

The invention relates to an alarm holder for fishing rods for telling when a fish is hooked on a line.

2. The Prior Art

U.S. Pat. No. 3,389,489 to Burns shows a fishing rod alarm accessory mounted on a tackle box. This, however, involves a rather complicated structure, which relies on the tension of the fishing line to operate the alarm.

U.S. Pat. No. 2,816,388 to Hartley shows a fishing rod support which is spring supported, and which actuates a signal. This is equally true of the structure shown in the Bauer Pat. No. 2,540,088 and in the Johnson Pat. No. 3,010,239.

SUMMARY OF THE INVENTION

According to the present invention, the fishing rod is held between a clamp mounted on one end of the hinged top of a fishing tackle box and a fork which is mounted at the end of an alarm pivoted on a supporting member extending upward at an acute angle from the end wall of the tackle box. This arm extends on both sides of its pivot where it is normally frictionally held. The lower end cooperates with a microswitch which rings a bell and also lights a lamp when a fish takes the bait.

Such an arrangement avoids the use of springs, and likewise provides a more responsive system than those of the prior art, in addition to which the structure is extremely simple and inexpensive.

BRIEF DESCRIPTION OF THE DRAWINGS

In the drawings:

FIG. 1 shows in side elevation a fishing alarm system embodying the invention;

FIG. 2 is a side view of the fork at the free end of the pivoted member;

FIG. 3 is a side view of the clamp for the handle of the fishing rod;

FIG. 4 is a wiring diagram;

FIG. 5 shows in side elevation another feature of the invention.

Referring to the drawings, a fishing rod 2 is adapted to engage in a clamp 4 mounted on the hinged top section of a fishing tackle box 14. The stem of the rod is adapted to rest in a fork 6 carried in a rod 8 pivoted at 10 on a member 12 upstanding at an acute angle from the end wall of the tackle box 14 remote from the clamp 4. The joint 10 is a frictional joint in the nature of a wing nut which offers frictional resistance to the turning of bar 8 around its pivot.

Mounted on the support member 12 near the lower end of the bar 9 is a microswitch or other suitable switch 16.

FIG. 4 shows that the switch 16 is mounted in series with a source of current and with a bell 18 and lights 20 and 24. There is also a switch 26 in the circuit, which, when in the position shown in solid lines, connects the bell 18 and the lights 20 and 24 to a battery 22 upon closing of the switch 16. Thus, when a fish takes the bait and pulls on a line on a rod 2, it will cause the bar 8 to swing counterclockwise and actuate switch 16, whereupon the lights 20 and 24 will light and the bell 18 will sound. By switching switch 26 to the position shown in broken lines, the light 24 inside the box on a flexible cord 28 and also the light 20 will be energized, so that it is possible to use the arrangement for illumination, without ringing the bell 18, and, at the same time, the light 24 can be moved to various positions to illuminate the interior of the tackle box to enable the fisherman to locate hooks, sinkers or other needed equipment.

While I have described herein one embodiment of my invention, I wish it to be understood that I do not intend to limit myself except within the scope of the claims hereto or hereinafter attached.

I Claim:

1. A fishing rod alarm device comprising a tackle box having a hinged top, means at one end of the top for holding the butt of a fishing rod, a support member extending upwardly at an acute angle from the body of the other end of the box, a member pivoted on said support and extending a substantial distance on each side of the pivot point, means on the upper end of said pivoted member for receiving the stem of a fishing rod, a switch member mounted on said support at a substantial distance below the pivot and in the path of movement of the lower end of said pivoted member, a source of current, an alarm means connected to said switch and to said source of current and actuated by closing of said switch.

2. In a device as claimed in claim 1, said alarm means comprising a bell and a lamp, and means independent of said switch for selectively connecting said lamp directly to said source of current and bypassing said bell.

3. In a device as claimed in claim 2, a second lamp, a flexible cord within the box to which said second lamp is connected, said switch also connecting said second lamp to the source of current.

4. In a device as claimed in claim 3, said selective connecting means also connecting said second lamp to the source of current.

5. In a device as claimed in claim 1, a second lamp, a flexible cord within the box to which said second lamp is connected, said switch also connecting said second lamp to the source of current.

* * * * *